United States Patent Office 3,387,038
Patented June 4, 1968

3,387,038
PROCESS FOR OXIDIZING PROPYLENE AND ISOBUTYLENE TO UNSATURATED ALDEHYDE
Theodore A. Koch, Wilmington, Del., assignor to E. I. du Pont de Nemours and Company, Wilmington Del., a corporation of Delaware
No Drawing. Continuation of application Ser. No. 226,454, Sept. 26, 1962. This application Feb. 23, 1966, Ser. No. 529,254
4 Claims. (Cl. 260—604)

ABSTRACT OF THE DISCLOSURE

Propylene or isobutylene are oxidized in the presence of water and oxygen at conversions of at least 25 percent to yield the corresponding aldehydes as principal olefin oxidation products over molybdenum oxide/group II–A metal oxide catalysts in which the molybdenum/group II–A metal ratio is in the range of at least 1 to 1 to 16 to 1.

This application is a continuation of application S.N. 226,454, filed Sept. 26, 1962, now abandoned.

It has been discovered that catalytic compositions composed of the oxides of certain metals of the Group II–A of the Periodic Chart of Elements combined with molybdenum oxide, are very selective in oxidizing propylene and isobutylene to the corresponding unsaturated aldehyde. The process for producing such an aldehyde comprises reacting in the vapor phase, propylene or isobutylene with oxygen and preferably with added water, at elevated temperatures in the presence of a catalyst comprising molybdenum oxide combined with the oxide of a metal selected from the group consisting of magnesium, calcium, strontium and barium, the atomic ratio of molybdenum to metal being at least 1:1. A preferred embodiment of this invention comprises the process wherein the aforementioned catalyst contains a catalytic promoter.

One of the essential components of the catalysts used in this invention is molybdenum combined in some manner with oxygen, which is referred to herein as "molybdenum oxide." Since the chemistry of molybdenum-oxygen compounds is very complex and is subject to considerable speculation, the exact chemical nature of the "molybdenum oxide" portion of these catalysts cannot be precisely described. In these catalysts, molybdenum probably is present as a molybdate, an isopolymolybdate or a heteropolymolybdate. These catalysts comprise molybdenum oxide which in turn is combined in some manner with an oxide of either magnesium, calcium, strontium or barium, and may be represented by the empirical formula $RO \cdot nMoO_3$, wherein R represents magnesium, calcium, strontium or barium. Depending on the procedure by which the catalyst is prepared, $n$ may vary from a value of about 1 to 16. Catalysts may be used wherein the value of $n$ is predominately 1, 2, or 3 etc., or the catalysts may be composed of a mixture of oxides having the empirical formula $RO \cdot nMoO_3$ in which the value of $n$ is different for each oxide. Thus it will be recognized that these catalysts are not definite chemical compounds. The exact chemical formula of these catalysts is immaterial so long as the catalytic composition comprises a molybdenum oxide, as defined above, which is combined in some manner with an oxide of one of the aforementioned Group II–A metals in such proportion so that the atomic ratio of molybdenum to said metal is at least 1:1.

The atomic ratio of molybdenum to the Group II–A metal should be at least 1:1. If the atomic ratio of molybdenum to metal is less than about 0.9:1, the catalytic activity of the composition is generally ineffective. However, useful activity is obtained when this atomic ratio is about 1:1. The most satisfactory results are obtained when this atomic ratio is about 1.05:1 to 1.1:1 or higher. Catalysts may be employed which have an atomic ratio of molybdenum to Group II–A metal considerably greater than 1.1:1, however no additional significant increase of catalytic activity is normally thereby obtained. Although catalysts having an atomic ratio of molybdenum to group II–A metal greater than 16:1 are operable in this invention, it is difficult to prepare such a catalyst and furthermore these catalysts tend to volatilize at elevated temperatures. Therefore, a practical upper limit for this atomic ratio is 16:1.

The catalysts described above which contain only molybdenum oxide combined with an oxide of magnesium, calcium, strontium, or barium, are completely satisfactory for purposes of this invention. However, it is beneficial to incorporate a promoter into these catalysts. Useful promoters include phosphorus, silicon, germanium, boron, arsenic, cerium, iron, aluminum, chromium, manganese, cobalt, titanium, zirconium, nickel, tellurium, bismuth, antimony and tin compounds. Those promoters which are most preferred for use in this invention are bismuth, antimony and tin, with generally the best results being obtained with a bismuth promoter.

The promoter may be incorporated into the catalyst in the form of an oxide or a salt such as a chloride, carbonate, sulfate, acetate, phosphate, hydrophosphate, molybdate, borate and the like. The amount of promoter added to the catalyst is not particularly critical. As little as 0.5 mol percent and as much as 20 mol percent of promoter based on the amount of catalyst (i.e. 0.005 to 0.20 atom of component promoter per atom of total component molybdenum plus Group II–A metal) gives a considerable increase in catalytic activity. The most pronounced effect is obtained by the addition of 1–15 mol percent of promoter based on the amount of catalyst. Although somewhat lesser increases in catalytic activity are obtained by incorporation of more than 20 mol percent of promoter with the catalyst, greater amounts than 20 mol percent can be present with resulting beneficial effects.

The most effective catalysts are obtained by precipitating molybdenum in the form of a molybdate from an aqueous molybdate solution by adding a soluble salt such as a nitrate, sulfate, acetate, chloride, etc., of a metal from the group consisting of magnesium, calcium, strontium and barium, the atomic ratio of molybdenum to said metal being at least 1:1. While water is ordinarily the most economical and practical precipitation medium, an organic liquid medium such as ethanol, acetylnitrile, and dimethylsulfoxide, may be used. A promoter may be conveniently incorporated with a precipitated catalyst by merely carrying out the precipitation in the presence of the promoter.

Precipitation of the catalyst can be carried out in the presence of heterogeneous catalyst supports, such as silica, alumina, silicon carbide, quartz and other inert supports. The catalyst can also be prepared by impregnation of a support followed by precipitation in situ.

After precipitation of the catalyst, the precipitate is filtered hot and then dried at about 100° C. Subsequently, the precipitate is broken into particles and calcined by heating at a temperature of about 400° C.–500 C. in a slowmoving stream of air for at least 3 or 4 hours. The precipitated catalyst is then formed into the desired size. The catalyst may be as coarse as 1 to 2 mesh, although the usual range is 4 to 100 mesh.

The exact procedure used to prepare a precipitated catalyst may vary widely. However, it is essential that the atomic ratio of the molybdenum to the Group II–A metal is at least 1:1. While a precipitated catalyst is preferred, the catalysts of this invention may be prepared by other methods known in the art, provided that the catalysts conform to the specific combination of constituents as set forth herein. For example, a catalyst may be prepared by fusing a mixture of the desired oxides.

The following example illustrates one method for preparing a particularly preferred promoted catalyst.

EXAMPLE I 107 grams of $Ca(NO_3)_2 \cdot 4H_2O$ (0.45 gram-moles) and 24.2 grams of $Bi(NO_3)_2 \cdot 5H_2O$ (0.05 gram-moles) were dissolved in 120 cc. of 15% $HNO_3$. This solution was added with vigorous stirring to a solution of 95 grams of $(NH_4)_6Mo_7O_{24} \cdot 4H_2O$ (0.55 gram-moles) in 500 cc. of water. The resultant precipitate was filtered and then oven dried at 105° C. overnight. The precipitate was then broken into particles and calcined at about 525° C. in an air stream of 0.5–1 liter/minute for about 8 hours. Subsequently the catalyst was ground to the desired particle size.

Prolonged use of these catalysts results in a decrease in catalytic effectiveness. The selectivity of these catalysts remains approximately constant with good yields of aldehyde being obtained, however, with use, the catalytic activity slowly decreases. A very simple way to regenerate these catalysts in situ, while the reaction proceeds uninterrupted, is to intermittently add an effective amount of molybdic acid to the water feed stream as required, or alternately, pellets of molybdic oxide may be placed in the reactor upstream from the catalyst bed. Other methods of catalyst regeneration will be apparent to those skilled in the art.

Any type of reactor suitable for vapor phase oxidation reactions may be used in the practice of this invention. It is preferred to use a reactor which contains a fixed or static bed of catalyst. A fluidized bed reactor may be used, however somewhat lower aldehyde yields are usually obtained.

The temperature of the reaction zone may vary from 350° C. to 650° C., although it is preferred to operate within the temperature range of 400° C. to 600° C. The actual surface temperature of the catalyst particles may be considerably higher because of the exothermic nature of the action. Pressure is not a critical factor in the practice of this invention. The process may be conveniently operated at atmospheric pressure. In most instances, the reaction is conducted at pressures ranging from 0.5 to 10 atmospheres, but higher or lower pressures may be used if desired.

The oxygen used in this process may be obtained from any source, although it is generally most economical and convenient to use air. Alternately, pure oxygen or mixtures of oxygen and air may be employed. It is preferred to introduce oxygen into the reaction zone with an olefin selected from the group consisting of propylene and isobutylene in an olefin:oxygen molar ratio of 1:1 to 4:1. The process may be operated outside this olefin:oxygen molar ratio range, but at somewhat of a sacrifice in aldehyde yield.

In the process of this invention, the oxidation reaction may be carried out with or without the presence of added water. However, it is generally preferable to introduce water into the reaction zone. This may be most easily accomplished by injecting steam into the olefin:oxygen reactants feed stream. The presence of water prevents the formation of explosive mixtures which may occur in anhydrous operations. The oxidation of propylene or isobutylene is a highly exothermic reaction and the water also serves as an effective heat transfer media. In addition, water in the reaction zone helps keep the catalyst clean of foreign matter and other undesirable residue.

For most operations water is added in amounts equal to the mol ratio of water to olefin of from 0.5:1 to 20:1. In the oxidation of propylene to yield acrolein, it is preferred to add water in an amount equal to the mol ratio of water to olefin of from 1:1 to 6:1.

Saturated hydrocarbons including methane, ethane, propane and isobutane may be used as diluents in the feed stream without adversely affecting the oxidation reaction. Therefore, propylene or isobutylene containing such saturated hydrocarbon impurities may be used in this process without prior purification. In some instances it may be desirable to add gaseous saturated hydrocarbons to the olefin feed stream to avoid explosive mixtures. The presence of these diluents also assists in temperature control.

The following examples showing the production of acrolein and methacrolein serve to further illustrate this invention, but the details of these examples are not intended to impose any limitations on the scope thereof. In each of these examples the apparatus used comprised an externally cooled, one-fourth inch diameter, stainless steel tubular reactor. This reactor contained a fixed catalyst bed.

EXAMPLE II

A vapor mixture of propylene, oxygen and water in a mol ratio of 2:1:3 (propylene:oxygen:water) was fed continuously into the reactor at a feed rate of 4 liters of vapor per 100 grams of catalyst per minute (corrected to standard temperature and pressure). The reactor contained an unpromoted calcium-molybdenum precipitated catalyst composed of molybdenum oxide and calcium oxide in a mol ratio of 1.02:1 (Mo:Ca). The reaction zone temperature was maintained at 450° C. As determined by gas chromatography, 26% of the propylene was converted to yield 67% acrolein based on the amount of propylene converted. The exit gas stream also contained $CO, CO_2, O_2$, unreacted propylene and a very small amount of other oxygenated compounds. Repetition of this example using a greater amount of water (mol ratio of water to propylene to 5:1) resulted in an increased percentage of the propylene being converted; the percent yield of acrolein remained approximately unchanged.

EXAMPLE III

Example II was repeated using a bismuth-promoted calcium-molybdenum precipitated catalyst composed of oxides of molybdenum, calcium and bismuth in a mol ratio of 1.05:1:0.05 (molybdenum:calcium:bismuth). A conversion of 37% propylene and a yield of 76% of acrolein based on the propylene consumed, were obtained.

EXAMPLE IV

Example II was repeated using on antimony-promoted calcium-molybdenum precipitated catalyst composed of oxides of molybdenum, calcium and antimony chloride in a mol ratio of 1.1:1:01 (molybdenum:calcium:antimony) The vapor mixture of propylene, oxygen and water was continuously fed into the reactor at a feed rate of 6 liters of vapor per 100 grams of catalyst per minute, and the reaction was carried out at 600° C. There was obtained a 46% propylene conversion and an acrolein yield of 57% based on the amount of propylene converted.

EXAMPLE V

Example II was repeated using a tin-promoted calcium-molybdenum precipitated catalyst composed of oxides of molybdenum, calcium, and tin in a mol ratio to 1.05:1:0.05 (molybdenum:calcium:tin). The reaction zone temperature was maintained at 500° C. There was obtained a conversion of 32% of the propylene to yield 72% acrolein.

EXAMPLE VI

Example II was repeated using a bismuth-promoted magnesium-molybdenum precipitated catalyst composed of oxides of molybdenum, magnesium, and bismuth in a mole ratio of 1.05:1:0.05 (molybdenum:magnesium:bismuth). There was obtained a 34% conversion of the propylene to yield 67% acrolein.

EXAMPLE VII

Example II was repeated using a bismuth-promoted strontium-molybdenum precipitated catalyst composed of oxides of molybdenum, strontium and bismuth in a mol ratio of 1.05:1:0.05 (molybdenum:strontium:bismuth). The reaction was conducted at 500° C. to obtain a propylene conversion of 29% and an acrolein yield of 53% based on the amount of propylene consumed.

EXAMPLE VIII

Example II was repeated using a bismuth-promoted barium-molybdenum precipitated catalyst composed of oxides of molybdenum, barium and bismuth in a mol ratio of 1.05:1:0.05 (molybdenum:barium:bismuth). The reaction zone temperature was maintained at 550° C. A 19% propylene conversion and a 27% acrolein yield was obtained.

EXAMPLE IX

A vapor mixture of isobutylene, oxygen and water in a mol ratio of 1.1:1:6.5 (isobutylene:oxygen:water) was fed continuously into the reactor at a feed rate of 6 liters of vapor per 100 grams of catalyst per minute. The reactor contained a bismuth-promoted magnesium-molybdenum precipitated catalyst composed of oxides of molybdenum, magnesium and bismuth in a mol ratio of 1.1:1:0.1 (molybdenum:magnesium:bismuth). The reaction was carried out at 550° C. to obtain an isobutylene conversion of 42% to yield 67% methacrolein based on the amount of isobutylene consumed.

EXAMPLE X

A vapor mixture of isobutylene, oxygen and water in a mol ratio of 1.1:1:6.3 (isobutylene:oxygen:water) was fed continuously into the reactor at a feed rate of 6 liters of vapor per 100 grams of catalyst per minute. The reactor contained a bismuth-promoted calcium-molybdenum precipitated catalyst composed of oxides of molybdenum, calcium and bismuth in a mol ratio of 1.1:1:0.1 (molybdenum:calcium:bismuth). The reaction zone temperature was 550° C. A 45% isobutylene conversion to yield 67% methacrolein was obtained.

I claim:

1. A continuous process for oxidizing an olefin of the formula $CH_2=CRCH_3$ to the corresponding aldehyde of formula $CH_2CRCHO$, wherein R is a member of the group consisting of H and $CH_3$, which comprises contacting said olefin together with added water and 0.25 to 1 mole of oxygen per mole of said olefin in the vapor phase at a temperature of 350° C. to 650° C. with a catalyst consisting essentially of oxides of (I) component molybdenum and (II) component Group II-A metal of the group consisting of calcium, magnesium and strontium, the atomic ratio of component molybdenum to component Group II-A metal being in the range of 1:1 to 16:1, for a time sufficient to oxidize at least 25 percent of said olefin, and separating said aldehyde from the resulting mixture as the principal olefin oxidation product.

2. Process according to claim 1 wherein said catalyst also contains 0.005 to 0.20 atom, per atom of total component molybdenum and Group II-A metal, of component promoter from the group consisting of bismuth, antimony and tin.

3. Process according to claim 2 wherein 1 to 6 moles of added water is present per mole of said olefin.

4. Process according to claim 3 wherein said olefin is propylene.

References Cited

UNITED STATES PATENTS

| | | | |
|---|---|---|---|
| 2,941,007 | 6/1960 | Callahan et al. | 260—604 |
| 1,735,763 | 11/1929 | Jaeger | 260—603 |
| 868,320 | 10/1907 | Blackmore | 260—603 |

FOREIGN PATENTS

| | | |
|---|---|---|
| 864,666 | 4/1961 | Great Britain, |
| 593,837 | 10/1947 | Great Britain. |

LEON ZITVER, *Primary Examiner.*

R. H. LILES, *Assistant Examiner.*